No. 802,077.  
PATENTED OCT. 17, 1905.  
A. C. HOBBS.  
SPEED INDICATOR.  
APPLICATION FILED JULY 8, 1905.
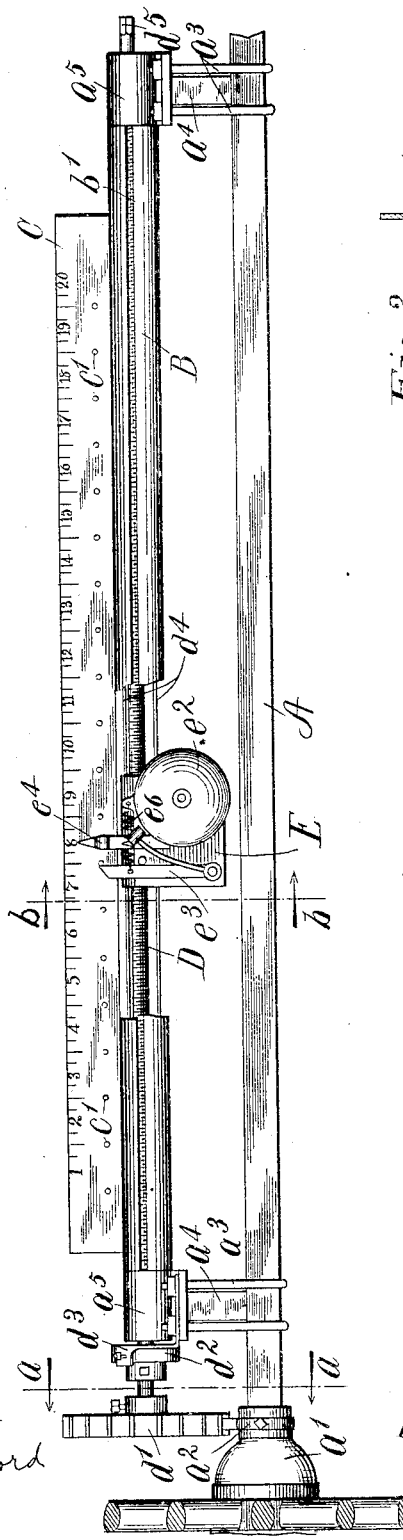
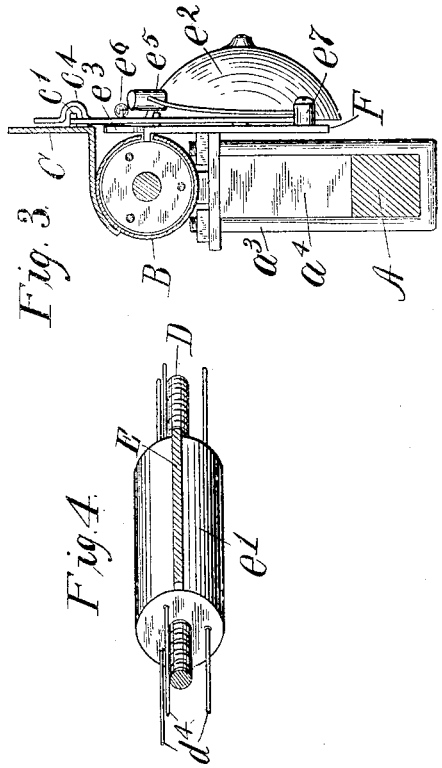
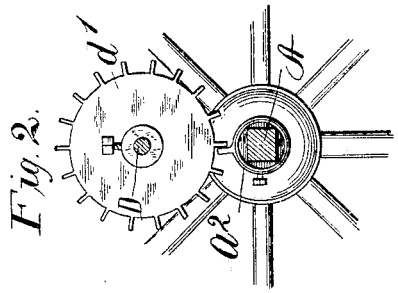
Witnesses:  
C. F. Bassett  
M. A. Milord
Inventor:  
A. C. Hobbs  
By Frederick P. Benjamin  
Atty.

UNITED STATES PATENT OFFICE.

ALBERT C. HOBBS, OF IRONTON, OHIO.

SPEED-INDICATOR.

No. 802,077.      Specification of Letters Patent.      Patented Oct. 17, 1905.

Application filed July 8, 1905. Serial No. 268,823.

*To all whom it may concern:*

Be it known that I, ALBERT C. HOBBS, a citizen of the United States, residing at Ironton, in the county of Lawrence and State of Ohio, have invented certain new and useful Improvements in Speed-Indicators, of which the following is a specification.

This invention relates to improvements in devices adapted to be attached to wheeled vehicles of all kinds and to indicate and register the rate of speed at which the vehicle moves and the distance it travels.

The special object of the improvements which form the subject-matter of this application for patent is to provide a device of simple and economical construction that can be readily applied to the axle of an ordinary vehicle and which will indicate by an alarm when a mile or other unit of distance has been traveled, so that an occupant by using a watch can learn at what rate of speed the vehicle is traveling without examining the register and also which at the end of a trip will show on a register the number of miles or units the vehicle has traveled.

In the accompanying drawings, which form a part of this application, I have shown a preferred adaptation of the principles of my invention in the following views.

Figure 1 is a front elevation of my device applied to a vehicle axle and wheel. Fig. 2 is a cross-section on the line $a\ a$ of Fig. 1. Fig. 3 is an enlarged cross-section on the line $b\ b$ of Fig. 1, and Fig. 4 is a detail in perspective of portions of the device.

Referring to the details of the drawings, A represents a common vehicle-axle, square in cross-section and made of metal. On one of the axle-spindles is mounted a wheel having a hub $a'$, around which is secured a band $a^2$, having a projecting extension or lug. Arranged on the axle near its ends are U-shaped clips $a^3$, which embrace blocks $a^4$, said clips and blocks serving to support bearing-blocks $a^5$, which are suitably secured thereto and which in turn furnish support for the indicating and registering elements to be described.

B represents a metal tube which extends substantially the length of the axle, has its ends secured to the blocks $a^5$, and is formed with a narrow slot extending longitudinally throughout the length of the tube. This tube proves a partially dust and weather proof casing for parts which it is desirable to so protect and which will be described and also affords a support to the register-plate C, which is secured thereto. This plate is formed from a piece of sheet metal bent longitudinally to furnish a portion adapted to partially embrace and be secured to the tube and a vertical portion on which is suitably indicated a scale representing miles or units of line or measurement. Inserted in the upright portion of the element C are a plurality of spaced pegs $c'$, the distance between the pegs being uniform and representing a unit of measurement. These pegs project beyond the face of the indicator-plate and, if desired, may be removably secured to said plate.

Extending throughout the tube B and suitably journaled in the bearings $a^5$ is a round steel rod D, which is threaded with the exception of its journals throughout its entire length and has its threads cut with a slight pitch. On one end of the rod is secured a toothed disk $d'$, so arranged that its teeth are in the plane of rotation of the collar $a^2$, and at each revolution of the projection on said collar one of the teeth of the disk will be engaged, and thus move the disk one step on its axis. Near the disk $d'$ a second disk $d^2$ is fixed on the rod D, and same is without teeth on its periphery. Secured to the clips $a^3$ adjacent to the disk $d^2$ is a shoe $d^3$, a portion of which overhangs said disk and is preferably provided with a set-screw which frictionally engages the face of the disk, and thus serves to check the disk $d'$ against too free movement on its axis. Within the tube, parallel with the rod and having their ends secured in the bearings $a^5$, are three wires $d^4$, which are stretched taut and serve in connection with the rod D to carry the traveling indicator, to be described, and also serve to hold said indicator in its proper position relative to the rod D. One end of the rod is squared, as at $d^5$, to facilitate the turning of the rod by a suitable crank or key.

E represents the traveling indicator, which is made of any suitable material and of such form and size as to best support its operative parts, which are a spool $e'$, a bell $e^2$, a trip-lever $e^3$, a pointer $e^4$, a bell-hammer $e^5$, and a spring $e^6$. The spool or cylindrical part $e'$ is rigidly secured to the body of the indicator, is internally threaded to receive the rod D, is bored to receive the wires $d^4$, and is adapted to travel freely through the tube B and on said wires. A portion of the indicator passes freely through the slot $b'$. The trip-lever $e^3$ is pivoted on a stud $e^7$, fixed in the indicator, has its free end beveled, is held in operative position by a spring $e^6$, and is adapted to contact with the pins $c'$ as the indicator travels along the rod D. The hammer is secured to and is operated by the trip-lever. The pointer $e^4$ is secured at its lower end to the indicator and has its upper end in position to register with the scale on the plate C.

It will be apparent that a device constructed as shown and described will operate as follows: Assuming that the traveling indicator is set at the beginning of the scale and the vehicle to which the device is attached is set in motion, the disk $d'$ will rotate, thus turning the roll D, which will cause the spool $e'$ to move longitudinally along said rod. As the trip-lever engages a peg or pin $c'$ it will be retracted against the tension of the spring $e^6$ and carry with it the bell-hammer. When the indicator has moved along sufficiently to permit the end of the lever to pass below the pin, the spring will return the lever to its normal position, and at the same time the hammer will sound the bell, and thus indicate to the occupant of the vehicle that a certain unit of distance has been traveled by the vehicle. By consulting his watch the occupant can learn the time required to travel such distance. At the end of the trip the pointer will show on the scale the total number of miles or units traveled. When the indicator has traveled the entire length of the rod D, the user will loosen the disk $d'$, apply a suitable crank or wrench to the end $d^5$, and by turning the rod in a direction reverse to its normal rotation cause the indicator to travel back to its initial position.

Having thus described my invention, what I claim as new, and desire to secure by Letters Patent, is—

1. In a device of the character described, a threaded rod rotatably mounted on a vehicle-axle, means for rotating said rod from a vehicle-wheel, an indicator mounted to travel on said rod by the rotation of the latter, a bell mounted on said indicator, a lever and a bell-hammer pivoted together on said indicator, and means for tripping said lever for the purpose set forth.

2. In a device of the character described, a threaded rod rotatably mounted on a vehicle-axle, means for rotating said rod from a vehicle-wheel, a slotted tubular cover for said rod, an indicator arranged on said rod and having a threaded engagement therewith, a bell secured to said indicator a lever and a bell-hammer pivoted together on said indicator, and means for tripping said lever at intervals for the purpose set forth.

3. In a device of the character described, a threaded rod rotatably mounted on a vehicle-axle, means for rotating said rod from a vehicle-wheel, means for checking the rotation of the rod, an indicator-plate having a scale indicated thereon, an indicator arranged on said rod and having a threaded engagement therewith, a bell secured to said indicator, a lever and a bell-hammer pivoted together on said indicator, means for tripping said lever at intervals, and a pointer secured to said indicator.

4. In a device of the character described, a threaded rod rotatably mounted on a vehicle-axle, means for rotating said rod from a vehicle-wheel, a slotted tubular cover for said rod, an indicator-plate secured to said cover and having a scale indicated thereon, an indicator arranged to travel on said rod, a bell secured to said indicator, a lever pivoted on said indicator, a bell-hammer secured to said lever, means on said indicator-plate for tripping said lever, a pointer secured to said indicator, and means for preventing the indicator from rotating on said rod.

In testimony whereof I affix my signature in presence of two witnesses.

ALBERT C. HOBBS.

Witnesses:
   GRACE M. JONES,
   L. K. COOPER.